UNITED STATES PATENT OFFICE.

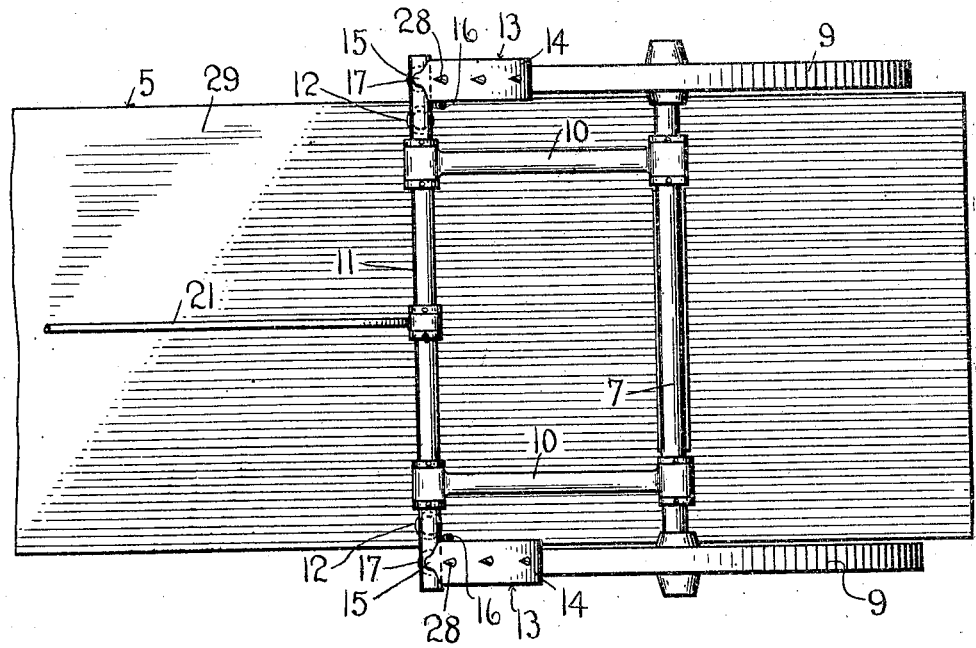
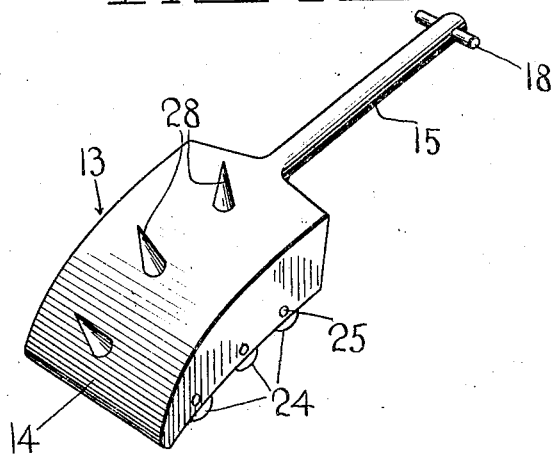

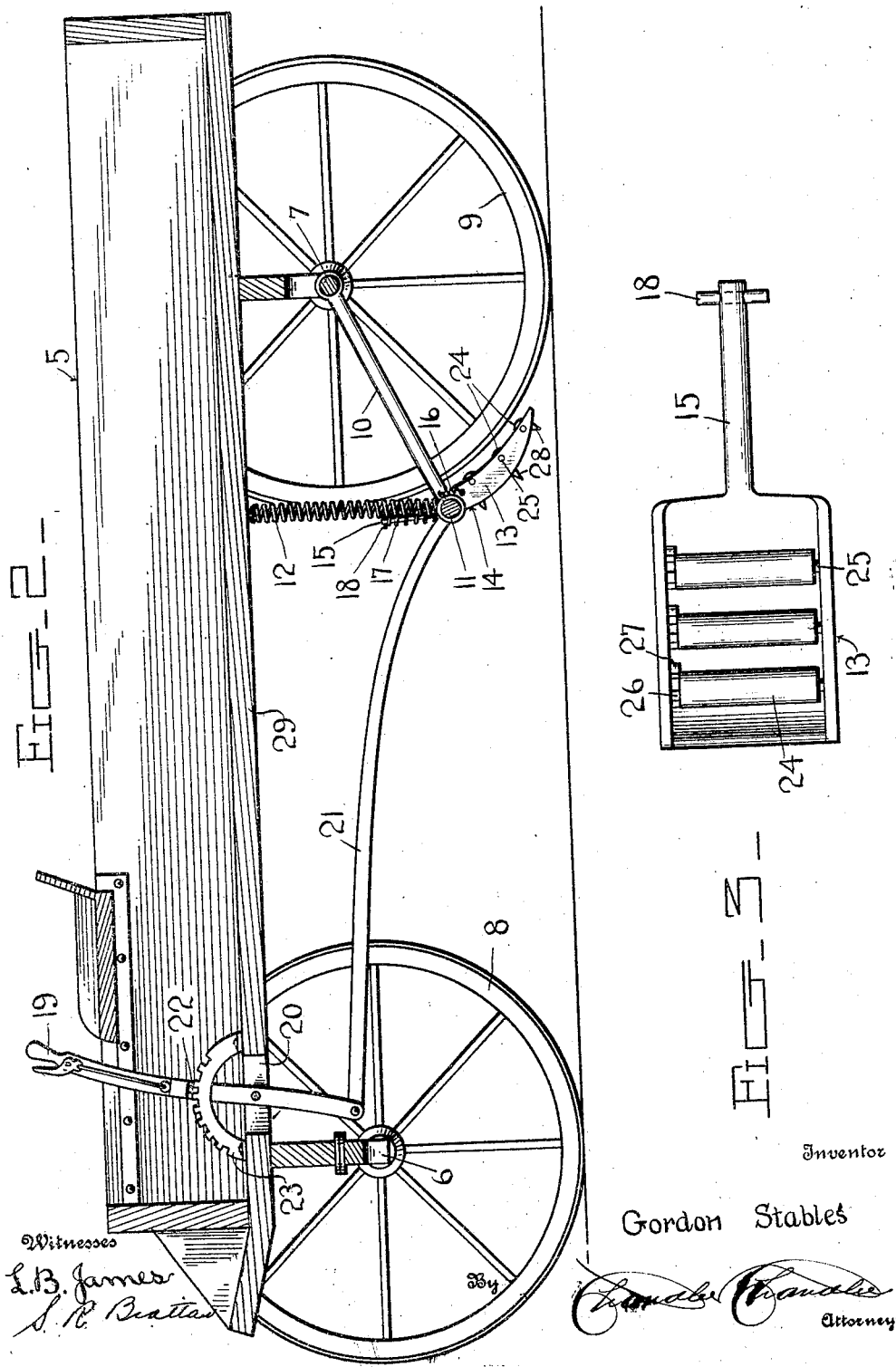

GORDON STABLES, OF PHILADELPHIA, PENNSYLVANIA.

VEHICLE-BRAKE.

928,720.

Specification of Letters Patent. Patented Nov. 2, 1909.

Application filed October 31, 1908. Serial No. 460,463.

*To all whom it may concern:*

Be it known that I, GORDON STABLES, a citizen of the United States, residing at Philadelphia, in the State of Pennsylvania, have invented certain new and useful Improvements in Vehicle-Brakes; and I do hereby declare the following to be a full, clear, and exact description of the invention, such as will enable others skilled in the art to which it appertains to make and use the same.

The present invention relates to brakes employed upon vehicles of various kinds, and it aims to provide an improved brake of the chock-block type, which is simple in design and easily applied and operated.

With the above and other ends in view, the invention consists in the construction, combination, and arrangement of parts, all as hereinafter more fully described, specifically claimed, and illustrated in the accompanying drawings, in which like parts are designated by corresponding reference numerals in the several views.

Of the said drawings—Figure 1 is an inverted plan view of a portion of the running gear of a vehicle with the improved brake applied thereto. Fig. 2 is a longitudinal section therethrough. Figs. 3 and 4 are respectively a plan view and a partially inverted perspective view of one of the brake shoes.

Referring more particularly to the drawings, 5 designates the body, 6 and 7 the front and rear axles, and 8 and 9 the front and rear wheels of a vehicle of any conventional type. The rear axle is provided with a pair of forwardly depending hangers 10, which are pivotally connected at their rear ends with said axle, and at their forward ends with a transversely disposed rod or shaft 11, which is normally pressed downward by a pair of heavy coil-springs 12, which are fastened at opposite ends to the floor 29 of the vehicle and to said rod. At its opposite ends said rod is provided with a pair of brake shoes 13, which are disposed in alinement with and slightly in advance of the corresponding rear wheels 9. The brake shoes, which are analogous to chock-blocks and have curved bottoms 14 and stems 15 formed on their upper ends and projected loosely through openings formed in the opposite ends of the rod 11, are cushioned in their braking action by retractile springs 16, which are connected with said shoes and with said rod and are also cushioned with respect to the latter by expansible springs 17, which surround the stems of said shoes and bear against said rod and against pins 18 disposed upon said stems. The rod 11, which carries the brake shoes is forced into elevated position against the action of the springs 12 by a hand lever 19, which extends through an opening 20 formed in the floor 29 adjacent the front end thereof, and is pivoted to said floor at such point, its lower end being connected with said rod by a link 21. The lever is held in adjusted position by a spring-pressed dog 22, which is designed to engage the teeth of a quadrant 23, supported upon the floor adjacent the opening 20.

The construction of the shoes 13 is illustrated more particularly in Figs. 3 and 4, from which it will be noted that transverse rollers 24 have their trunnions 25 journaled in the sides of said shoes said rollers being provided at one end thereof with ratchet wheels 26, which are engaged by pawls 27 pivoted to the shoes. As the wheels rotate, the rollers 24 compensate for their movement and absorb their momentum, but the pawl and ratchet mechanism prevents rotation of the rollers as the vehicle is backed to release the shoes, said shoes being provided on their under surfaces with ground-engaging spurs 28.

In operation, assuming that it is desired to bring the vehicle to a sudden stop, the dog 22 is released from engagement with the quadrant 23 when the coil-springs 12 will be free to expand and swing the rod 11 and hangers 10 downwardly, thus throwing the brake shoes under the wheels, when the vehicle will be at once stopped. To release the shoes, it is only necessary to pull the lever 19 rearwardly, when the rod 11 will be raised, owing to the link connection 21 between said rod and lever, the upward movement of the rod throwing the shoes into their inoperative position.

From the foregoing description it will be seen that simple and efficient means are provided for accomplishing the objects of the invention, but, while the elements herein shown and described are well adapted to serve the functions set forth, it is obvious that various minor changes may be made in the proportions, shape, and arrangement of the several parts, without departing from the spirit and scope of the invention as defined in the appended claim.

What is claimed, is—

The combination, with a vehicle including a body, front and rear axles connected therewith, and wheels carried by said axles; of a brake mechanism comprising a pair of downwardly and forwardly inclined brackets pivoted to the rear axle, a transversely disposed rod carried by said brackets, a brake shoe slidably mounted at each end of said rod and disposed in alinement with and slightly in advance of the adjacent rear wheel, a link pivoted at its rear end to said rod, a lever pivoted intermediate its ends to the vehicle body and at its lower end to the forward end of said link, for swinging said hod bodily upward, to render said shoes inoperative, means for retaining said lever in adjusted position, and a pair of coil springs connected with the vehicle body and with the opposite ends of said rod, for automatically lowering the latter when said retaining means are released from engagement with said lever, to force said shoes under the rear wheels into engagement with the ground.

In testimony whereof, I affix my signature, in presence of two witnesses.

GORDON STABLES.

Witnesses:
M. A. QUINLAN,
Jos. I. MURRAY.